United States Patent [19]

Sprague et al.

[11] 4,346,965
[45] Aug. 31, 1982

[54] LIGHT MODULATOR/DEFLECTOR USING ACOUSTIC SURFACE WAVES

[75] Inventors: Robert A. Sprague, Saratoga, Calif.; Dror Sarid, Penfield, N.Y.

[73] Assignee: Xerox Corporation, Stamford, Conn.

[21] Appl. No.: 153,381

[22] Filed: May 27, 1980

[51] Int. Cl.³ .............................................. G02F 1/16
[52] U.S. Cl. ................................... 350/358; 350/356
[58] Field of Search ............................... 350/356, 358

[56] References Cited

U.S. PATENT DOCUMENTS 3,958,862  5/1976  Scibor-Rylski ................... 350/356
4,004,847  1/1977  McNaney ............................ 350/358

*Primary Examiner*—William L. Sikes
*Attorney, Agent, or Firm*—Franklyn C. Weiss

[57] ABSTRACT

A light modulator/deflector which uses acoustic surface waves wherein an illuminating beam 10 enters the side of and strikes the active surface 18 of a transparent, piezoelectric, and electrooptic acoustic substrate 12 near the grazing angle of incidence and is reflected off that surface 18 through the remaining portion of substrate 12 and out the other side thereof into at least a zero order undiffracted direction and a first order diffracted direction. For a modulator the light 10 is made to converge in the plane of incidence so that it comes to focus on the active surface 18 of the acoustic device. For a deflector, the light 10 is collimated so that it interacts with as much of the acoustic wave 20 as possible. A set of interdigital electrodes 16 is evaporated on this surface 18 so as to launch acoustic waves 20 in a direction normal to the plane of incidence of the light.

4 Claims, 5 Drawing Figures

FIG. 4.A

LIGHT MODULATOR/DEFLECTOR USING ACOUSTIC SURFACE WAVES

The invention relates to a light modulator/deflector which uses acoustic surface waves; the modulator/deflector utilizing a transparent acoustic substrate in which surface acoustic waves are generated to effect the modulation or deflection of an input beam of light.

BACKGROUND OF THE INVENTION

From 1885 when Lord Rayleigh first described the acoustic waves that travel along the earth's surface to present day use in scanning and communication systems, scientists have been interested in the action of acoustic waves in solid materials. It was demonstrated several years ago by workers at Bell Telephone Laboratories that ultrasonic waves with frequencies of a billion hertz and up are capable of travelling several centimeters through a solid medium. Best known, of course, for the use of acoustic waves in a solid medium is the piezoelectric crystal. Compression of such a crystal generates an electrostatic voltage across it and, conversely, application of an electric field may cause the crystal to expand or contract in certain directions.

In recent years, the acoustic wave technology expanded rapidly after the developed of the interdigital transducer, an efficient type of transducer for converting an electrical signal into an acoustic surface wave and for reconverting the acoustic wave back into an electrical signal. When such an interdigital transducer is placed on a piezoelectric material such as quartz or lithium niobate ($LiNbO_3$), and a rapidly changing electrical signal is applied to the transducer, the piezoelectric material will vibrate in unison with the electrical signal, generating a sound wave.

Combining the use of acoustic waves and optical light sources is known as acousto-optics. Acousto-optics is commonly used for achieving modulation and scanning of laser beams. This is normally done by using bulk acoustic waves which produce index of refraction variations within a material. These index of refraction variations interact with a laser beam causing diffraction of the beam. By turning the acoustic wave on and off, the amount of diffraction can be changed, achieving modulation of the diffracted light. By changing the frequency of the acoustic wave, the direction of diffraction can be changed, resulting in scanning of the output beam in angle.

The same type of deflection and modulation has been achieved, as shown in the art, by interaction of the light with acoustic surface waves. Use of surface waves rather than bulk waves is advantageous because attenuation can be lower (resulting in potentially higher resolution from a scanner), acoustic velocity is slower (resulting in smaller devices), and high frequency transducers are easier to fabricate. However, achieving interaction of light with waves is difficult. In the past, it was accomplished by coupling light into a thin film waveguide on the material surface, interacting with the surface wave, and then coupling out of the thin film. The need for such coupling makes devices utilizing thin films on the surface of materials unattractive for systems applications because of light loss in the coupling process and optical quality problems in traversing the thin film. See an article by Yoshiro Ohmachi in the Journal of Applied Physics, Vol. 44, No. 9, September 1973, pps. 3928 to 3933, entitled "Acousto-optical Light Diffraction in Thin Films".

According to the present invention, a technique is described for using acoustic surface waves to produce light deflectors and modulators. The interaction between the light and the acoustic waves is achieved by allowing the light to suffer total internal reflection near grazing incidence from the active device surface in a plane perpendicular to the direction of travel of the acoustic wave. Such devices have possible bandwidth, number of resolvable scanning spots, and cost advantages over currently used bulk wave devices.

DESCRIPTION OF THE DRAWINGS

For a more complete understanding of the invention, reference may be had to the following detailed description of the invention in conjunction with the drawings wherein:

FIGS. 4A and 4B are block diagrams of another embodiment of the present invention.

DETAILED DESCRIPTION OF THE INVENTION

Figure 1:
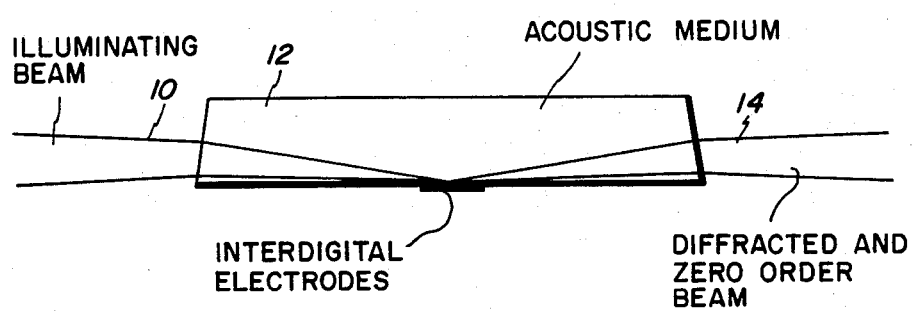
FIG. 1 is a side view of an acoustic medium impinged from the side by an illuminating light beam.
Figure 2:
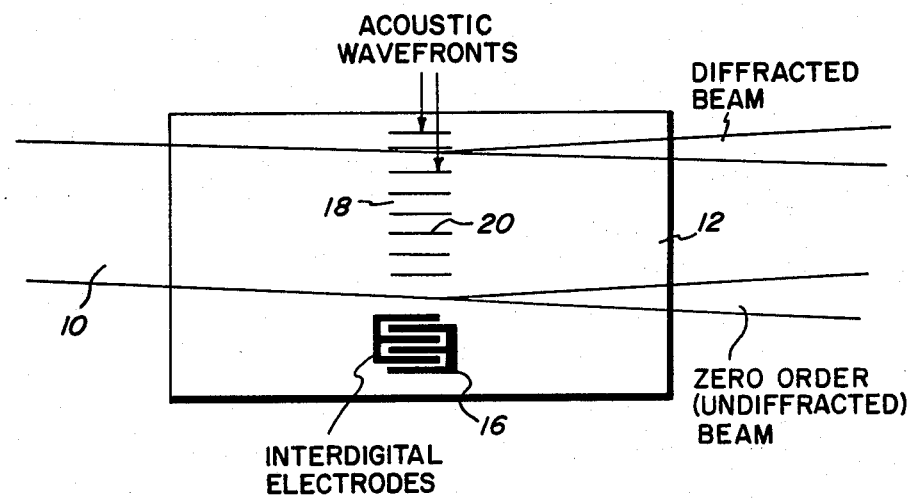
FIG. 2 is a top view of the acoustic medium and illuminating light beam seen in FIG. 1.

FIGS. 1 and 2 depict the basic geometry of devices contemplated by the present invention. The illuminating beam 10 enters the side of a transparent piezoelectric and electrooptic acoustic material 12, strikes the active surface 18 of the acoustic material 12 near the grazing angle of incidence, and is reflected off that surface 18 through the remaining portion of the acoustic material 12 and out the other side thereof. The illuminating beam 10 could be, for instance, a HeNe (helium-neon) laser source while the transparent acoustic medium 12 could be $LiNbO_3$(lithium niobate).

In the preferred mode of operation, light 10 is made to converge in the plane of incidence so that it comes to focus on the active surface 18 of the acoustic device. A set of interdigital electrodes 16 is evaporated on this surface 18, in the known prior art techniques, so as to launch acoustic waves 20 in a direction normal to the plane of incidence of the light. This direction would be into the page in FIG. 1 and up the page in FIG. 2.

The light 10 thus crosses the acoustic beam 20 in a direction parallel to the acoustic wavefronts. Good interaction between the light 10 and the sound 20 is insured since the sound waves cross the beam at the focus location 18 where the beam is narrow in height, and strike the reflecting surface near grazing incidence to assure a long interaction length. A total internal reflection geometry for interaction has been shown by Dror Sarid and G. I. Stegeman, in "Light Scattering On Internal Reflection From Surface Acoustic Waves", paper FO12, Optical Society of America annual meeting in Toronto, Canada, Oct. 10-14, 1977, to enable good diffraction efficiency of the light, an essential figure of merit for fabrication of usable acousto-optic devices.

The beam focus in the other direction (along the direction of propogation of the acoustic wave) is chosen for the particular device application, as it is for bulk acoustic devices. For a modulator, the light is preferably focused to form a narrow beam at the location of the acoustic wave. For a deflector, the light 10 is collimated, as shown in FIGS. 1 and 2, so that it interacts with as much of the acoustic wave 20 as possible.

The basic geometry of the apparatus shown in FIGS. 1 and 2 would, of course, be somewhat different in a practical device. Modifications must be made to account for diffraction of the acoustic wave as differentiated from the light wave, Bragg angle matching of the wavefront direction and light beam propogation directions, multiple transducers for wideband operation, and heat sinking to avoid device overheating. These modifications are well known in the literature as previously described for thin film surface wave devices and can be applied to all devices built using the principles described in conjunction with FIGS. 1 to 4 herein.

Figure 3:
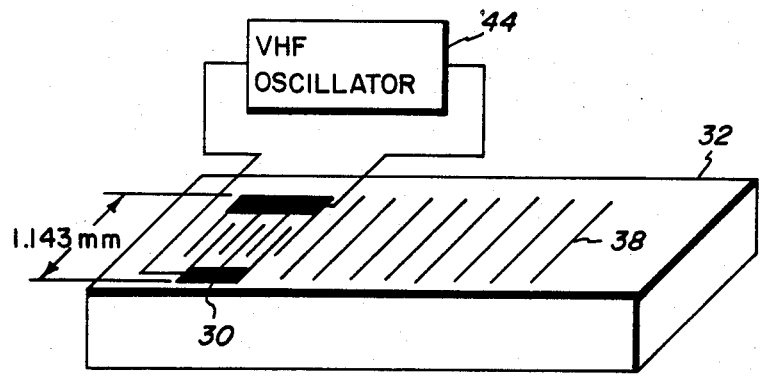
FIG. 3 is a block diagram of one embodiment of the present invention.
Figure 4B:
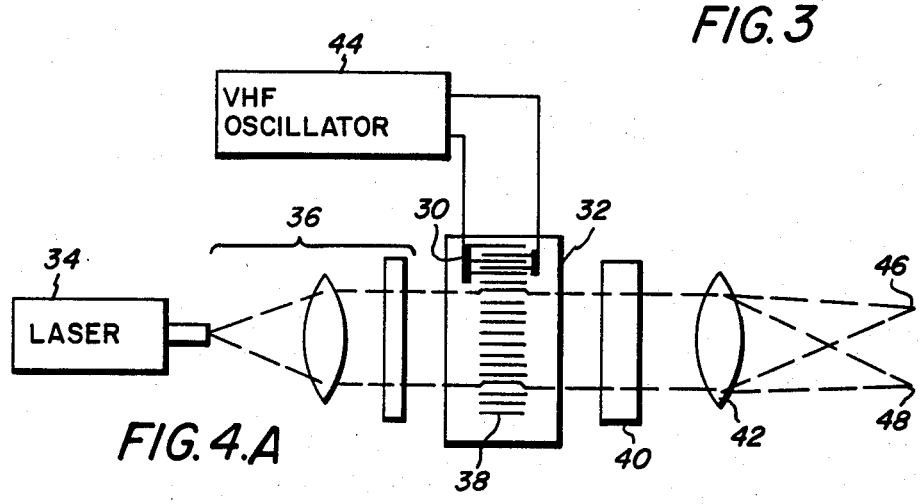
Figure 4B:
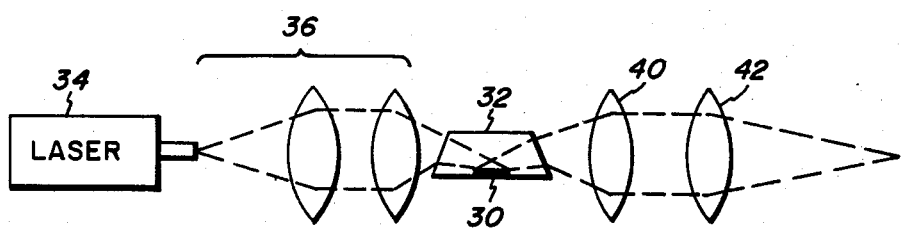

In one experiment utilizing the principles of the present invention for a scanner, a surface wave device was built on a lithium niobate substrate 32 as shown in FIG. 3. The transducer 30 was interdigitated, with 3½ finger pairs, having a length of 1.143 mm, a center frequency of 335 MHz, and an electrical impedance of 40 Ohms. The transducer was connected to a VHF oscillator 44 which could be ramped in frequency over a wide range of frequencies. This device was placed in the optical apparatus similar to the setup of FIGS. 4A and 4B. The beam from laser 34 was incident on a set of anamorphic optics 36 which collimated the light in the plane of the surface wave 38 and caused it to come to a focus on the surface wave device in the plane of incidence, as described in the proceeding text and also shown in FIGS. 1 and 2. The light leaving the surface wave device 32 was recollimated in the plane of incidence by cylinder lens 40 and then focussed by spherical lens 42 to form two spots of light: one the undiffracted beam 46 and one the diffracted beam 48. By turning the drive source 44 on and off, the diffracted beam 48 could be observed to turn on and off, indicating modulation capability. By changing the frequency of output driver 44, the spot could be seen to scan across a line from point 46 to point 48. This scanning operation was demonstrated by pulsing the output of the oscillator 44 as the frequency was swept in time. This produced a series of spots at the output which could be used to expose a photographic plate. This particular device was determined to have a resolution of about 280 resolvable spots. Measurement of the percentage of light diffracted into the first order were made on the scanning spot, indicating a diffraction efficiency greater than 50% for certain sets of experimental conditions. Modifications of the transducers used in this experiment enables fabrication of a device having 2000–4000 spot resolution, as compared to present state-of-the-art bulk wave deflectors having about 1000 spot resolution.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. An acousto-optic modulator/deflector system including a light source (34) and an electrical signal source (44) comprising:
    a piezoelectric substrate (32) having relatively flat sides,
    a set of interdigital electrodes (30) on one side of said substrate (32), said electrodes introducing on the surface of said substrate acoustic waves (38) in response to an electrical signal from said electrical signal source applied to said interdigital electrodes,
    a illuminating light beam from said light source introduced into said substrate (32) through a side adjacent to the side with said interdigital electrodes (30), said beam being directed at said side at an angle such that the light beam suffers total internal reflection near the grazing incidence of the active surface where the acoustic waves (38) are generated, in a plane perpendicular to the direction of travel of the acoustic waves, the output beam being reflected from the active surface containing the acoustic waves and leaving said substrate through the remaining portion of said substrate in a zero order undiffracted direction (48) and a first order diffracted direction (46).

2. The acousto-optic system as set forth in claim 1 including means (36) for focusing the light beam into a narrow beam at the location of the active surface of the acoustic waves (38), said source of electrical signals (44) to the interdigital electrodes (30) being interrupted in a pattern so as to provide modulation to the output light beam from said substrate.

3. The acousto-optic system as set forth in claim 1 including means (36) for collimating the light beam (34) so as to interact with substantially all of the active surface of the acoustic waves (38), the electrical signals (44) to the interdigital electrodes (30) varying in frequency between predetermined limits so as to provide a predetermined angular scan (46, 48) of the diffracted output light beam from said substrate.

4. An acousto-optic modulator-deflector system for reflecting an impinging illuminating light beam into an output beam comprising a zero order undiffracted direction and a first order diffraction direction:
    a piezoelectric substrate (32) having relatively flat sides,
    a set of interdigital electrodes (30) on one side of said substrate (32), said electrodes introducing on the surface of said substrate acoustic waves (38) in response to an electrical signal applied to said interdigital electrodes, said illuminating light beam being introduced into said substrate (32) through a side adjacent to the side with said interdigital electrodes (30) and directed at said side at an angle such that the light beam suffers total internal reflection near the grazing incidence of the active surface where the acoustic waves (38) are generated in a plane perpendicular to the direction of travel of the acoustic waves, said output beam being reflected from the active surface containing the acoustic waves and leaving the substrate through the remaining portion of said substrate.

* * * * *